US012608682B2

(12) United States Patent
Wuslich et al.

(10) Patent No.: US 12,608,682 B2
(45) Date of Patent: Apr. 21, 2026

(54) DYNAMICALLY PROVIDING CYBERSECURITY TRAINING BASED ON USER-SPECIFIC THREAT INFORMATION

(71) Applicant: Proofpoint, Inc., Sunnyvale, CA (US)

(72) Inventors: Mark Wuslich, Aliquippa, PA (US); Alan James Himler, Pittsburgh, PA (US); Ali Mazzotta, Pittsburgh, PA (US); Kurt Frederick Wescoe, Pittsburgh, PA (US); Richard Charles Miles, Sunnyvale, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 671 days.

(21) Appl. No.: 17/119,564

(22) Filed: Dec. 11, 2020

(65) Prior Publication Data

US 2021/0390510 A1      Dec. 16, 2021

Related U.S. Application Data

(60) Provisional application No. 63/039,631, filed on Jun. 16, 2020.

(51) Int. Cl.
G06Q 10/107          (2023.01)
G06Q 10/0635         (2023.01)
(Continued)

(52) U.S. Cl.
CPC ....... G06Q 10/107 (2013.01); G06Q 10/0635 (2013.01); G06Q 10/105 (2013.01); G09B 5/02 (2013.01); G09B 19/0053 (2013.01); H04L 51/212 (2022.05); H04L 51/42 (2022.05); H04L 63/1416 (2013.01); H04L 63/1441 (2013.01)

(58) Field of Classification Search
None
See application file for complete search history.

(56) References Cited

U.S. PATENT DOCUMENTS

| | | |
|---|---|---|
| 2013/0203023 A1 | 8/2013 | Sadeh-Koniecpol et al. |
| 2014/0199663 A1 | 7/2014 | Sadeh-Koniecpol et al. |
| | (Continued) | |

OTHER PUBLICATIONS

Oct. 26, 2021—(EP) Extended European Search Reoprt—App 21176516.9.
Oct. 10, 2023—(EP) First Examination Report—App 21176516.9.

*Primary Examiner* — James B Hull
(74) *Attorney, Agent, or Firm* — Banner & Witcoff, Ltd.

(57)          ABSTRACT

Aspects of the disclosure relate to dynamically providing cybersecurity training based on user-specific threat information. A computing platform may receive, from a targeted attack protection (TAP) server, user-specific threat information indicating at least one threat that has been encountered by at least one user. The computing platform may identify one or more users to receive cybersecurity training in a first cybersecurity training topic based on the user-specific threat information indicating the at least one threat that has been encountered by the at least one user. Subsequently, the computing platform may load one or more cybersecurity training modules based on identifying the one or more users to receive the cybersecurity training in the first cybersecurity training topic. Then, the computing platform may provide the one or more cybersecurity training modules to one or more user computing devices.

17 Claims, 8 Drawing Sheets

(51) Int. Cl.

| | |
|---|---|
| *G06Q 10/105* | (2023.01) |
| *G09B 5/02* | (2006.01) |
| *G09B 19/00* | (2006.01) |
| *H04L 9/40* | (2022.01) |
| *H04L 51/212* | (2022.01) |
| *H04L 51/42* | (2022.01) |

(56) References Cited

U.S. PATENT DOCUMENTS

| | | | |
|---|---|---|---|
| 2014/0199664 A1 | 7/2014 | Sadeh-Koniecpol et al. | |
| 2017/0103674 A1* | 4/2017 | Sadeh-Koniecpol | ......................... G06F 21/566 |
| 2018/0041537 A1 | 2/2018 | Bloxham et al. | |
| 2019/0020682 A1* | 1/2019 | Edwards | ................. H04L 51/18 |
| 2019/0173919 A1 | 6/2019 | Irimie et al. | |

* cited by examiner

100

110

111

112

Cybersecurity Training
Computing Platform

Processor(s)

Memory(s)

Cybersecurity Training
Module
112a

TAP Integration Engine
112c

Cybersecurity Training
User Database
112b

Cybersecurity Training
Template Library
112d

113

Communication Interface(s)

300

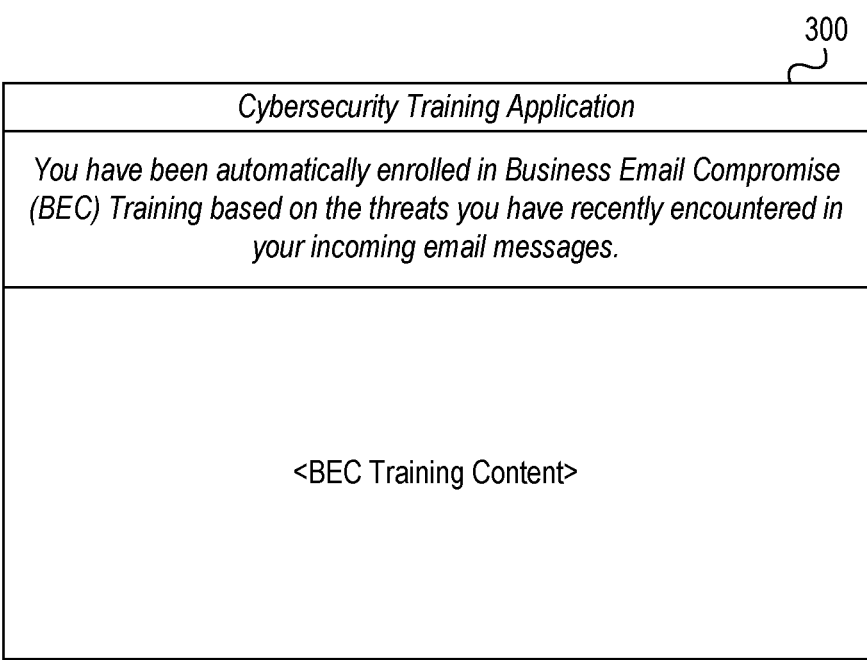

| Cybersecurity Training Application |
|---|
| *You have been automatically enrolled in Business Email Compromise (BEC) Training based on the threats you have recently encountered in your incoming email messages.* |
| <BEC Training Content> |

| Cybersecurity Training Application |
|---|
| *You have been automatically enrolled in Malware Training based on the threats you have recently encountered in your incoming email messages.* |
| <Malware Training Content> |

FIG. 4

DYNAMICALLY PROVIDING CYBERSECURITY TRAINING BASED ON USER-SPECIFIC THREAT INFORMATION

CROSS-REFERENCE TO RELATED APPLICATIONS

This application claims the benefit of and priority to U.S. Provisional Patent Application Ser. No. 63/039,631, filed Jun. 16, 2020, and entitled "TAP-Identified Training," which is incorporated by reference herein in its entirety.

TECHNICAL FIELD

Aspects of the disclosure relate to digital data processing systems, data processing methods, machine learning systems, communication systems and networks, and cybersecurity. In particular, one or more aspects of the disclosure relate to dynamically providing cybersecurity training based on user-specific threat information.

BACKGROUND

Increasingly, users of computing devices and electronic communications services face various cybersecurity threats, including malicious phishing attempts and spam messages. While some tools have been developed to combat these threats, it remains difficult to provide enterprise users and other users with access to electronic information (which may, e.g., be remotely hosted and/or linked to in electronic communications sent to such users) in a manner that efficiently and effectively ensures the safety of each user, each user's personal information, and each user's computing device. One effective protection measure is training users to recognize and avoid cybersecurity threats that they encounter on a regular basis. But this too can be problematic, as it may be difficult to determine which users are encountering which threats, which users are most susceptible to threats, and/or which users are more likely to be targeted by malicious actors. Moreover, these issues are further complicated when attempting to balance and optimize the consumption of the computing resources required to provide such protective features in an automated fashion while being constrained by the limitations imposed by finite processing power and limited network bandwidth.

SUMMARY

Aspects of the disclosure provide technical solutions that overcome one or more of the technical problems described above and/or other technical challenges. For instance, one or more aspects of the disclosure relate to dynamically providing cybersecurity training based on user-specific threat information.

In accordance with one or more embodiments, a computing platform having at least one processor, a communication interface, and memory may receive, via the communication interface, from a targeted attack protection (TAP) server, user-specific threat information indicating at least one threat that has been encountered by at least one user. Subsequently, the computing platform may identify one or more users to receive cybersecurity training in a first cybersecurity training topic based on the user-specific threat information indicating the at least one threat that has been encountered by the at least one user. Then, the computing platform may load one or more cybersecurity training modules based on identifying the one or more users to receive the cybersecurity training in the first cybersecurity training topic. Next, the computing platform may provide the one or more cybersecurity training modules to one or more user computing devices.

In some embodiments, receiving the user-specific threat information indicating the at least one threat that has been encountered by the at least one user may include receiving information stored by the TAP server based on the TAP server monitoring email traffic and identifying cybersecurity threats associated with the email traffic.

In some embodiments, receiving the user-specific threat information indicating the at least one threat that has been encountered by the at least one user may include receiving information indicating that a first enterprise user has encountered a first message-based threat and a second enterprise user has encountered a second message-based threat.

In some embodiments, receiving the user-specific threat information indicating the at least one threat that has been encountered by the at least one user may include receiving information indicating one or more user identifiers and one or more specific threats corresponding to the one or more user identifiers.

In some embodiments, receiving the user-specific threat information indicating the at least one threat that has been encountered by the at least one user may include receiving threat family information associated with the at least one user and threat degree information associated with the at least one user.

In some embodiments, identifying the one or more users to receive the cybersecurity training in the first cybersecurity training topic based on the user-specific threat information indicating the at least one threat that has been encountered by the at least one user may include identifying a first user of the one or more users to receive the cybersecurity training in the first cybersecurity training topic based on the user-specific threat information indicating that the first user has encountered a specific threat corresponding to the first cybersecurity training topic.

In some embodiments, identifying the one or more users to receive the cybersecurity training in the first cybersecurity training topic based on the user-specific threat information indicating the at least one threat that has been encountered by the at least one user may include identifying a second user of the one or more users to receive the cybersecurity training in the first cybersecurity training topic based on the user-specific threat information indicating that the second user is a top clicker.

In some embodiments, identifying the one or more users to receive the cybersecurity training in the first cybersecurity training topic based on the user-specific threat information indicating the at least one threat that has been encountered by the at least one user may include identifying a third user of the one or more users to receive the cybersecurity training in the first cybersecurity training topic based on the user-specific threat information indicating that the third user is a very attacked person (VAP).

In some embodiments, providing the one or more cybersecurity training modules to the one or more user computing devices may include generating one or more training user interfaces based on information associated with the one or more cybersecurity training modules, and sending, via the communication interface, to a user computing device, the one or more training user interfaces generated based on the information associated with the one or more cybersecurity training modules. In addition, sending the one or more training user interfaces generated based on the information associated with the one or more cybersecurity training modules may cause the user computing device to display the one or more training user interfaces generated based on the information associated with the one or more cybersecurity training modules.

In some embodiments, providing the one or more cybersecurity training modules to the one or more user computing devices may include automatically enrolling a specific user in a specific training module.

In some embodiments, prior to providing the one or more cybersecurity training modules to the one or more user computing devices, the computing platform may dynamically adapt at least one training module of the one or more cybersecurity training modules based on the user-specific threat information.

In some embodiments, the computing platform may identify one or more additional users to receive cybersecurity training in a second cybersecurity training topic based on the user-specific threat information, where the second cybersecurity training topic is different from the first cybersecurity training topic. Subsequently, the computing platform may load one or more additional cybersecurity training modules based on identifying the one or more additional users to receive the cybersecurity training in the second cybersecurity training topic. Then, the computing platform may provide the one or more additional cybersecurity training modules to one or more additional user computing devices.

In some embodiments, prior to providing the one or more additional cybersecurity training modules to the one or more additional user computing devices, the computing platform may dynamically adapt at least one training module of the one or more additional cybersecurity training modules based on the user-specific threat information.

BRIEF DESCRIPTION OF THE DRAWINGS

The present disclosure is illustrated by way of example and not limited in the accompanying figures in which like reference numerals indicate similar elements and in which:

FIGS. 3 and 4 depict illustrative user interfaces for dynamically providing cybersecurity training based on user-specific threat information in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to dynamically providing cybersecurity training based on user-specific threat information. For example, in some arrangements, systems and methods are provided for identifying users for cybersecurity training based on 'top clicker' information and/or 'very attacked person' (VAP) information received from a targeted attack protection (TAP) platform (which may, e.g., monitor email traffic associated with various users). In some instances, in addition to identifying users to be trained, the specific type(s) of training that a specific user should receive may be determined based on threat information received from the TAP platform. For instance, the TAP platform may provide information indicating that a particular user faces a relatively large amount of business email compromise (BEC) threats, and this information may be used to automatically enroll the user in one or more cybersecurity training modules that are tailored to BEC threats. These and other features are illustrated in greater detail below.

Figure 1A:
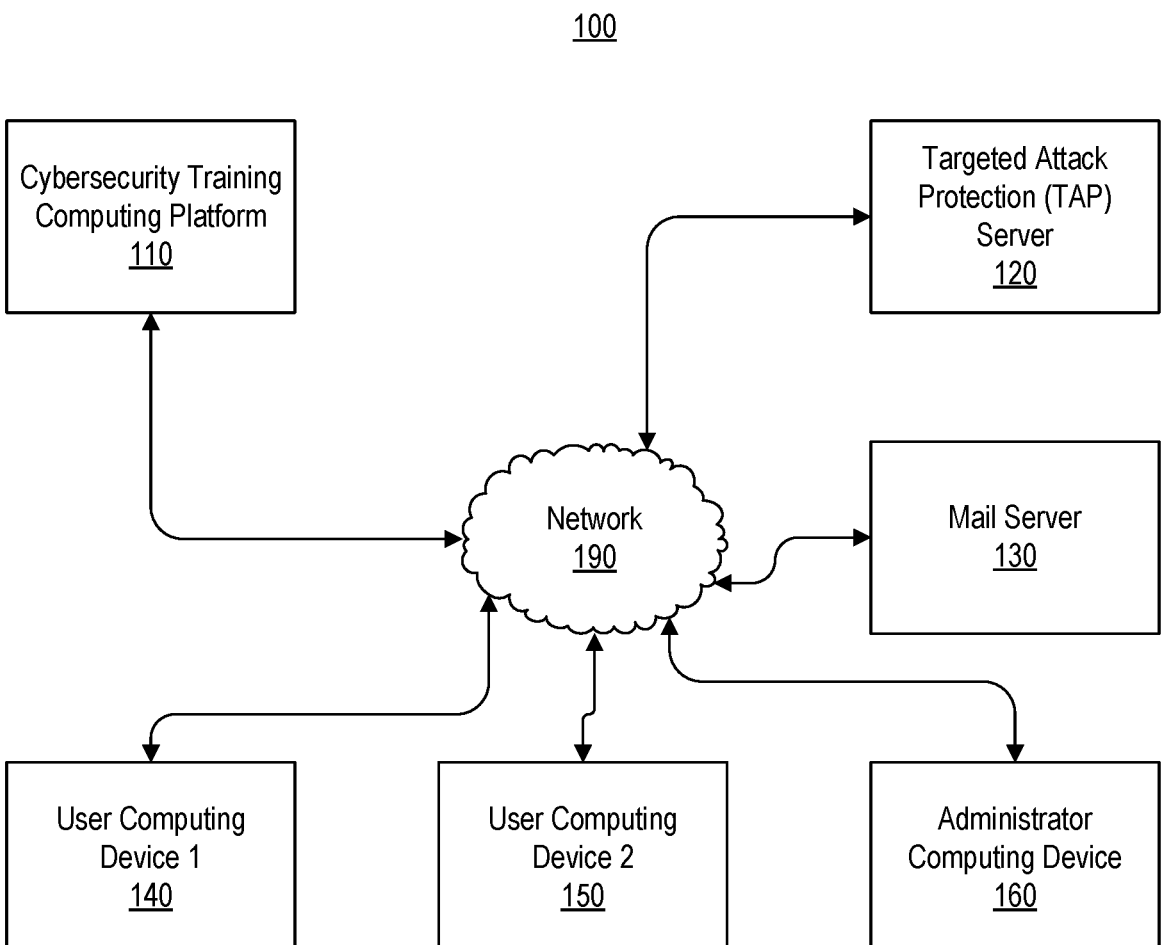
FIGS. 1A and 1B depict an illustrative operating environment for dynamically providing cybersecurity training based on user-specific threat information in accordance with one or more example embodiments.
Figure 1B:
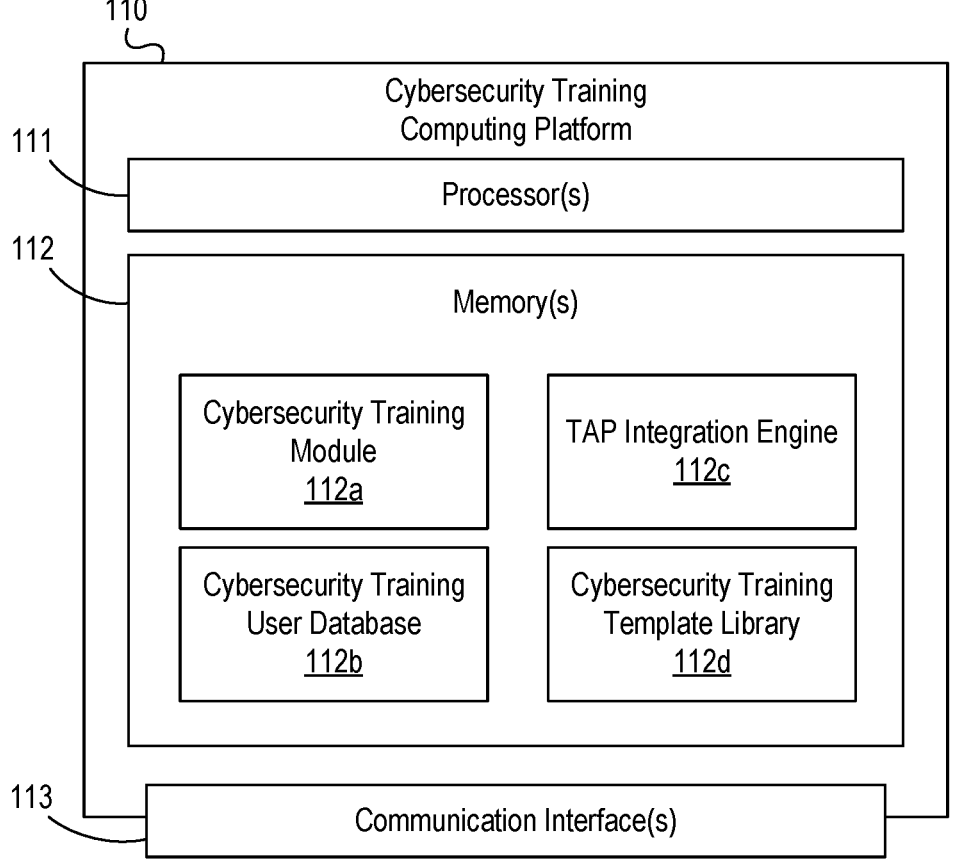

FIGS. 1A and 1B depict an illustrative operating environment for dynamically providing cybersecurity training based on user-specific threat information in accordance with one or more example embodiments. Referring to FIG. 1A, computing environment 100 may include various computer systems, computing devices, networks, and/or other operating infrastructure. For example, computing environment 100 may include a cybersecurity training computing platform 110, a targeted attack protection (TAP) server 120, a mail server 130, a first user computing device 140, a second user computing device 150, an administrator computing device 160, and a network 190.

Network 190 may include one or more wired networks and/or one or more wireless networks that interconnect cybersecurity training computing platform 110, targeted attack protection server 120, mail server 130, user computing device 140, user computing device 150, administrator computing device 160, and/or other computer systems and/or devices. In addition, each of cybersecurity training computing platform 110, targeted attack protection server 120, mail server 130, user computing device 140, user computing device 150, administrator computing device 160 may be special purpose computing devices configured to perform specific functions, as illustrated in greater detail below, and may include specific computing components such as processors, memories, communication interfaces, and/or the like.

Targeted attack protection server 120 may be configured to generate and/or store user profiles (which may, e.g., correspond to different users associated with different organizations), monitor message traffic (which may, e.g., include messages sent and/or received by users associated with the user profiles), identify threats included in the message traffic (which may, e.g., include identifying malicious links and/or attachments included in such message traffic), and store user-specific threat information (which may, e.g., indicate specific threats that were received and/or otherwise encountered by specific users in the monitored message traffic). Additionally or alternatively, targeted attack protection server 120 may be configured to maintain other information associated with the users for which message traffic is being monitored, such as information indicating a user's role and/or authority within their organization, information indicating whether a user is a very attacked person within their organization, and/or information indicating whether a user is a top clicker (e.g., someone who is relatively more likely to click on a link included in an email message than other users) within their organization.

Mail server 130 may be configured to send, receive, and/or otherwise process messages (e.g., inbound and outbound email messages). In some instances, mail server 130 may be associated with a particular organization (e.g., an enterprise organization), while in other instances, mail server 130 may be configured to process messages for users associated with different organizations.

User computing device 140 may be configured to be used by a first user (who may, e.g., be an enterprise user associated with an enterprise organization operating mail server 130). In some instances, user computing device 140 may be configured to present one or more user interfaces associated with a message application (e.g., an email client application) that may receive information from, send information to, and/or otherwise exchange information with mail server 130. Additionally or alternatively, user computing device 140 and/or one or more software applications executing on user computing device 140 may receive information from, send information to, and/or otherwise exchange information cybersecurity training computing platform 110 and targeted attack protection server 120.

User computing device 150 may be configured to be used by a second user (who may, e.g., be an enterprise user associated with an enterprise organization operating mail server 130 and who may be different from the first user of user computing device 140). In some instances, user computing device 150 may be configured to present one or more user interfaces associated with a message application (e.g., an email client application) that may receive information from, send information to, and/or otherwise exchange information with mail server 130. Additionally or alternatively, user computing device 150 and/or one or more software applications executing on user computing device 150 may receive information from, send information to, and/or otherwise exchange information cybersecurity training computing platform 110 and targeted attack protection server 120.

Administrator computing device 160 may be configured to be used by an administrative user (who may, e.g., be a network administrator of an enterprise organization operating mail server 130). Administrator computing device 160 may be configured to present one or more user interfaces associated with an administrative dashboard (e.g., a cybersecurity dashboard), receive and/or display one or more alerts, and/or otherwise facilitate monitoring and management of one or more systems and/or devices included in computing environment 100.

Referring to FIG. 1B, cybersecurity training computing platform 110 may include one or more processor(s) 111, one or more memory(s) 112, and one or more communication interface(s) 113. In some instances, cybersecurity training computing platform 110 may be made up of a plurality of different computing devices, which may be distributed within a single data center or a plurality of different data centers. In these instances, the one or more processor(s) 111, one or more memory(s) 112, and one or more communication interface(s) 113 included in cybersecurity training computing platform 110 may be part of and/or otherwise associated with the different computing devices that form cybersecurity training computing platform 110.

In one or more arrangements, processor(s) 111 may control operations of cybersecurity training computing platform 110. Memory(s) 112 may store instructions that, when executed by processor(s) 111, cause cybersecurity training computing platform 110 to perform one or more functions, as discussed below. Communication interface(s) 113 may include one or more wired and/or wireless network interfaces, and communication interface(s) 113 may connect cybersecurity training computing platform 110 to one or more networks (e.g., network 190) and/or enable cybersecurity training computing platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause cybersecurity training computing platform 110 to perform various functions), databases (which may, e.g., store data used by cybersecurity training computing platform 110 in performing various functions), and/or other elements (which may, e.g., include processing engines, services, and/or other elements). For example, memory(s) 112 may store and/or otherwise provide a cybersecurity training module 112a, a cybersecurity training user database 112b, a TAP integration engine 112c, and a cybersecurity training template library 112d. In some instances, cybersecurity training module 112a may store instructions that cause cybersecurity training computing platform 110 to dynamically provide cybersecurity training based on user-specific threat information and/or execute one or more other functions described herein. Additionally, cybersecurity training user database 112b may store data that is used by cybersecurity training computing platform 110 in dynamically providing cybersecurity training based on user-specific threat information, such as user profile information. TAP integration engine 112c may store instructions and/or data that enable cybersecurity training computing platform 110 to exchange user-specific threat information and/or other information with targeted attack protection server 120 and/or other data servers and/or data sources. Cybersecurity training template library 112d may store one or more training templates that may be used by cybersecurity training computing platform 110 in dynamically providing cybersecurity training based on user-specific threat information, such as specific templates for training users in specific cybersecurity topics.

Figure 2A:
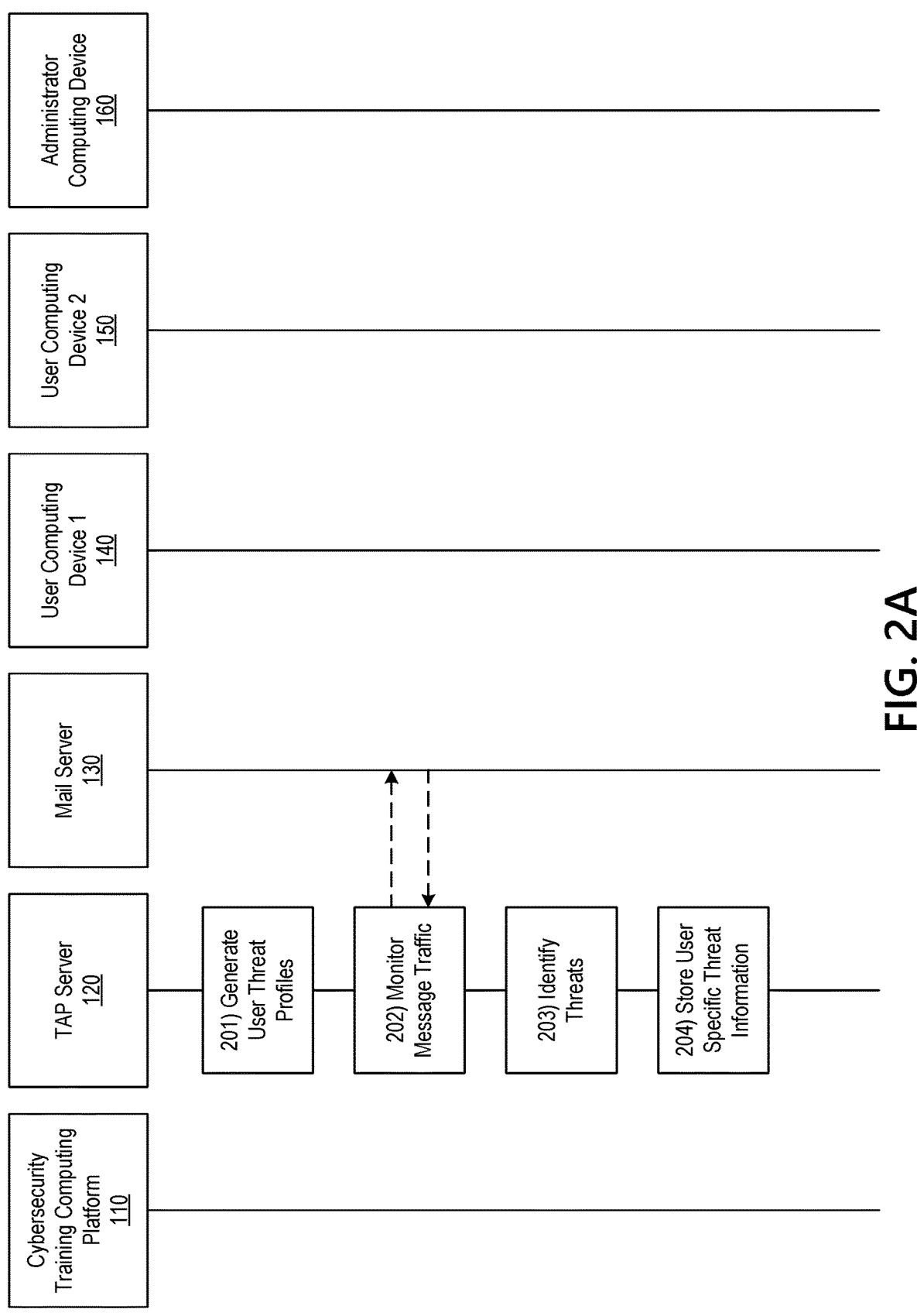
FIGS. 2A-2D depict an illustrative event sequence for dynamically providing cybersecurity training based on user-specific threat information in accordance with one or more example embodiments.

FIGS. 2A-2D depict an illustrative event sequence for dynamically providing cybersecurity training based on user-specific threat information in accordance with one or more example embodiments. Referring to FIG. 2A, at step 201, targeted attack protection server 120 may generate a plurality of user threat profiles. For example, an enterprise organization may have a plurality of users, and targeted attack protection server 120 may generate a user profile for each user of the plurality of users associated with the enterprise organization. Each user profile may, for instance, include the corresponding user's name, email address and/or other user identifier, one or more risk scores, threat profile information (which may, e.g., indicate what threats a user has been exposed to and/or otherwise at risk for) that is specific to the corresponding user, and/or other information. Each user profile also may, for instance, include one or more fields for storing user-specific threat information, which may include information identifying specific threats encountered by the user at specific dates and/or times, specific sources of such threats, risk categories and/or severity levels associated with such threats, and/or other threat information.

At step 202, targeted attack protection server 120 may monitor message traffic. For example, at step 202, targeted attack protection server 120 may exchange data with mail server 130 to scan email traffic and/or other message information being processed by mail server 130. Such email traffic and/or other message information may include message headers, message body content, and/or other information associated with messages being received by, sent via, and/or otherwise processed by mail server 130.

At step 203, targeted attack protection server 120 may identify one or more threats present in the message traffic. For example, at step 203, targeted attack protection server 120 may determine that one or more specific users have received one or more specific messages that contain one or more specific cybersecurity threats, such as phishing attempts, malware attachments, spam content, business email compromise (BEC) attempts, and/or other threats. Targeted attack protection server 120 may identify and/or otherwise determine the presence of such threats by scanning the message information monitored at step 202, evaluating the message information against one or more threat profiles, and/or applying one or more machine learning algorithms that are configured to identify cybersecurity threats.

At step 204, targeted attack protection server 120 may store user-specific threat information. For example, at step 204, based on identifying the one or more threats present in the message traffic, targeted attack protection server 120 may store user-specific threat information identifying that one or more specific users have encountered one or more specific threats (e.g., in messages that they have received and/or been sent). In some instances, targeted attack protection server 120 may store the user-specific threat information in each user's user profile. For instance, targeted attack protection server 120 may store user-specific threat information identifying specific threats encountered by the user at specific dates and/or times, specific sources of such threats (e.g., emails from specific senders and/or domains), risk categories and/or severity levels associated with such threats (e.g., phishing category, malware category, BEC category, low severity, medium severity, high severity, etc.), and/or other threat information.

Figure 2B:
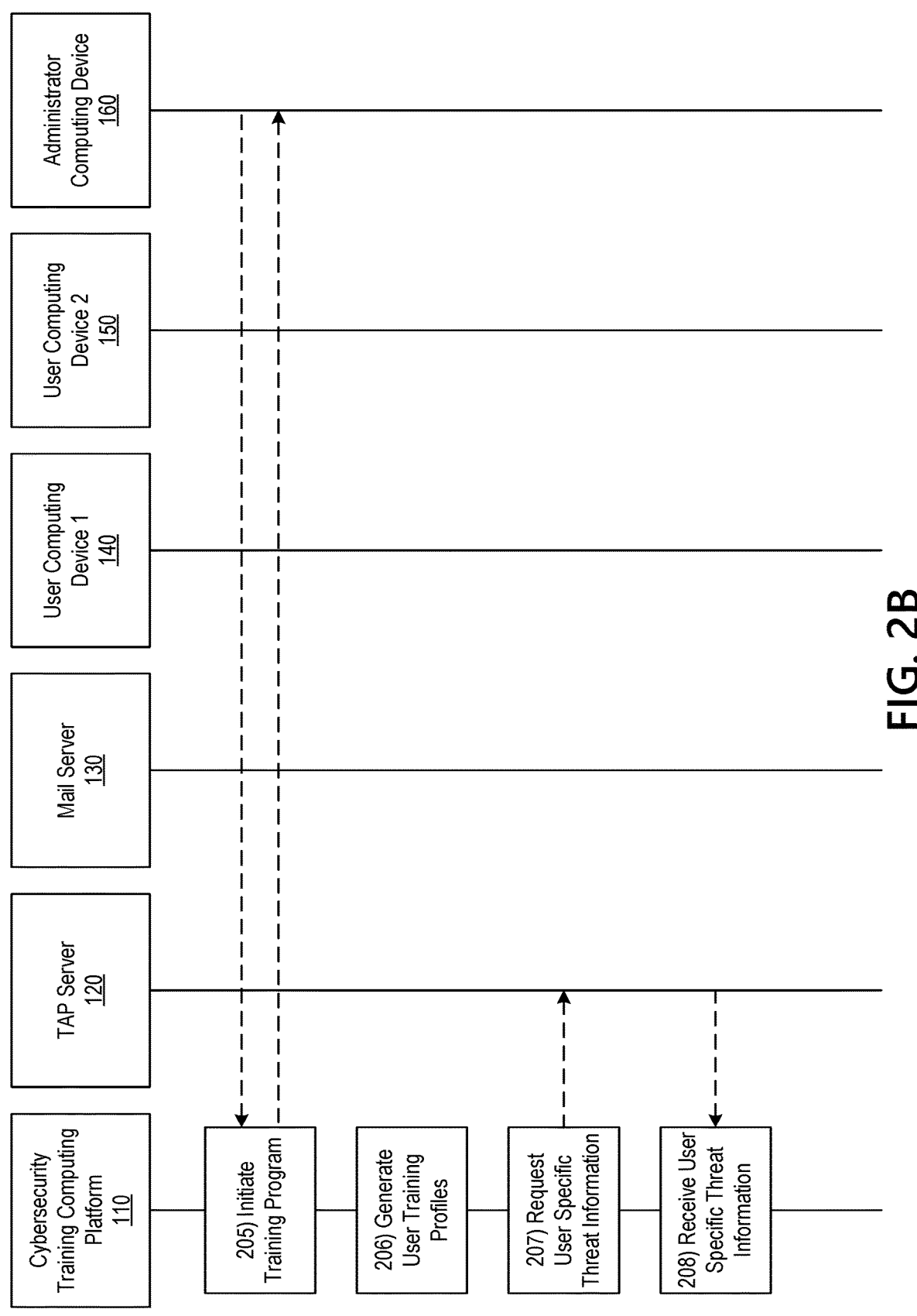

Referring to FIG. 2B, at step 205, cybersecurity training computing platform 110 may initiate a cybersecurity training program. For example, at step 205, cybersecurity training computing platform 110 may receive a request and/or configuration information from administrator computing device 160 directing cybersecurity training computing platform 110 to provide one or more users with cybersecurity training. As illustrated in greater detail below, cybersecurity training computing platform 110 may use the user-specific threat information maintained by targeted attack protection server 120 in dynamically customizing the cybersecurity training program for each user to be trained, based on the specific cybersecurity threats encountered by each user in their email message traffic.

At step 206, cybersecurity training computing platform 110 may generate one or more user training profiles. For example, at step 206, cybersecurity training computing platform 110 may generate one or more user training profiles based on the user threat profiles that were generated and/or are maintained by targeted attack protection server 120. In some instances, the user training profiles generated by cybersecurity training computing platform 110 may include and/or initially correspond to the user threat profiles maintained by targeted attack protection server 120, and cybersecurity training computing platform 110 may exchange information with targeted attack protection server 120 to obtain the user threat profiles from targeted attack protection server 120. Additionally or alternatively, cybersecurity training computing platform 110 may generate and/or add to the user training profiles based on user input (which may, e.g., be received from administrator computing device 160) and/or information from other sources, such as other training platforms, corporate directories, and/or other user databases.

At step 207, cybersecurity training computing platform 110 may request user-specific threat information (e.g., from targeted attack protection server 120). For example, at step 207, based on initiating the cybersecurity training program and/or generating the user training profiles, cybersecurity training computing platform 110 may request the user-specific threat information generated by and/or maintained on targeted attack protection server 120.

At step 208, cybersecurity training computing platform 110 may receive the user-specific threat information. For example, at step 208, cybersecurity training computing platform 110 may receive, via the communication interface (e.g., communication interface 113), from a targeted attack protection (TAP) server (e.g., targeted attack protection server 120), user-specific threat information indicating at least one threat that has been encountered by at least one user. For instance, targeted attack protection server 120 may track enterprise users, what emails they are receiving, what threats are being presented in those emails, and what links and/or other items are being selected and/or otherwise interacted with by specific users, as illustrated above. And, at step 208, cybersecurity training computing platform 110 may receive any and/or all of this information from the TAP platform.

In some embodiments, receiving the user-specific threat information indicating the at least one threat that has been encountered by the at least one user may include receiving information stored by the TAP server based on the TAP server monitoring email traffic and identifying cybersecurity threats associated with the email traffic. For example, in receiving the user-specific threat information indicating the at least one threat that has been encountered by the at least one user at step 208, cybersecurity training computing platform 110 may receive information stored by the TAP server (e.g., targeted attack protection server 120) based on the TAP server (e.g., targeted attack protection server 120) monitoring email traffic and identifying cybersecurity threats associated with the email traffic, as illustrated above.

In some embodiments, receiving the user-specific threat information indicating the at least one threat that has been encountered by the at least one user may include receiving information indicating that a first enterprise user has encountered a first message-based threat and a second enterprise user has encountered a second message-based threat. For example, in receiving the user-specific threat information indicating the at least one threat that has been encountered by the at least one user at step 208, cybersecurity training computing platform 110 may receive information indicating that a first enterprise user has encountered a first message-based threat and a second enterprise user has encountered a second message-based threat. For instance, the first user may have encountered a business email compromise in a message that they received, and the second user may have encountered a malware threat in a message that they received, and cybersecurity training computing platform 110 may receive information identifying which message/threat was received by which user.

In some embodiments, receiving the user-specific threat information indicating the at least one threat that has been encountered by the at least one user may include receiving information indicating one or more user identifiers and one or more specific threats corresponding to the one or more user identifiers. For example, in receiving the user-specific threat information indicating the at least one threat that has been encountered by the at least one user at step 208, cybersecurity training computing platform 110 may receive information indicating one or more user identifiers and one or more specific threats corresponding to the one or more user identifiers. For example, cybersecurity training computing platform 110 may receive, from targeted attack protection server 120, email addresses of enterprise users who have been identified as 'top clickers' or 'very attacked persons' relative to other users in their enterprise organization and/or email addresses of users who have encountered specific types of cybersecurity threats.

In some embodiments, receiving the user-specific threat information indicating the at least one threat that has been encountered by the at least one user may include receiving threat family information associated with the at least one user and threat degree information associated with the at least one user. For example, in receiving the user-specific threat information indicating the at least one threat that has been encountered by the at least one user at step 208, cybersecurity training computing platform 110 may receive threat family information associated with the at least one user and threat degree information associated with the at least one user. For instance, cybersecurity training computing platform 110 may receive, from targeted attack protection server 120, information indicating, for each identified user, what specific threats and/or threat families that user is facing and/or relative degrees to which the user is encountering these threats. Targeted attack protection server 120 may, for example, provide information indicating that one user is a 'top clicker' who encounters a relatively large amount of malware, as well as information indicating that another user is a 'very attacked person' who encounters a relatively large amount of BEC threats and/or other, similar information concerning other users. Other threat families besides malware and BEC (which may, e.g., be identified in information received from cybersecurity training computing platform 110 from targeted attack protection server 120) may include phishing, spear-phishing, and families related to other types of threats.

Figure 2C:
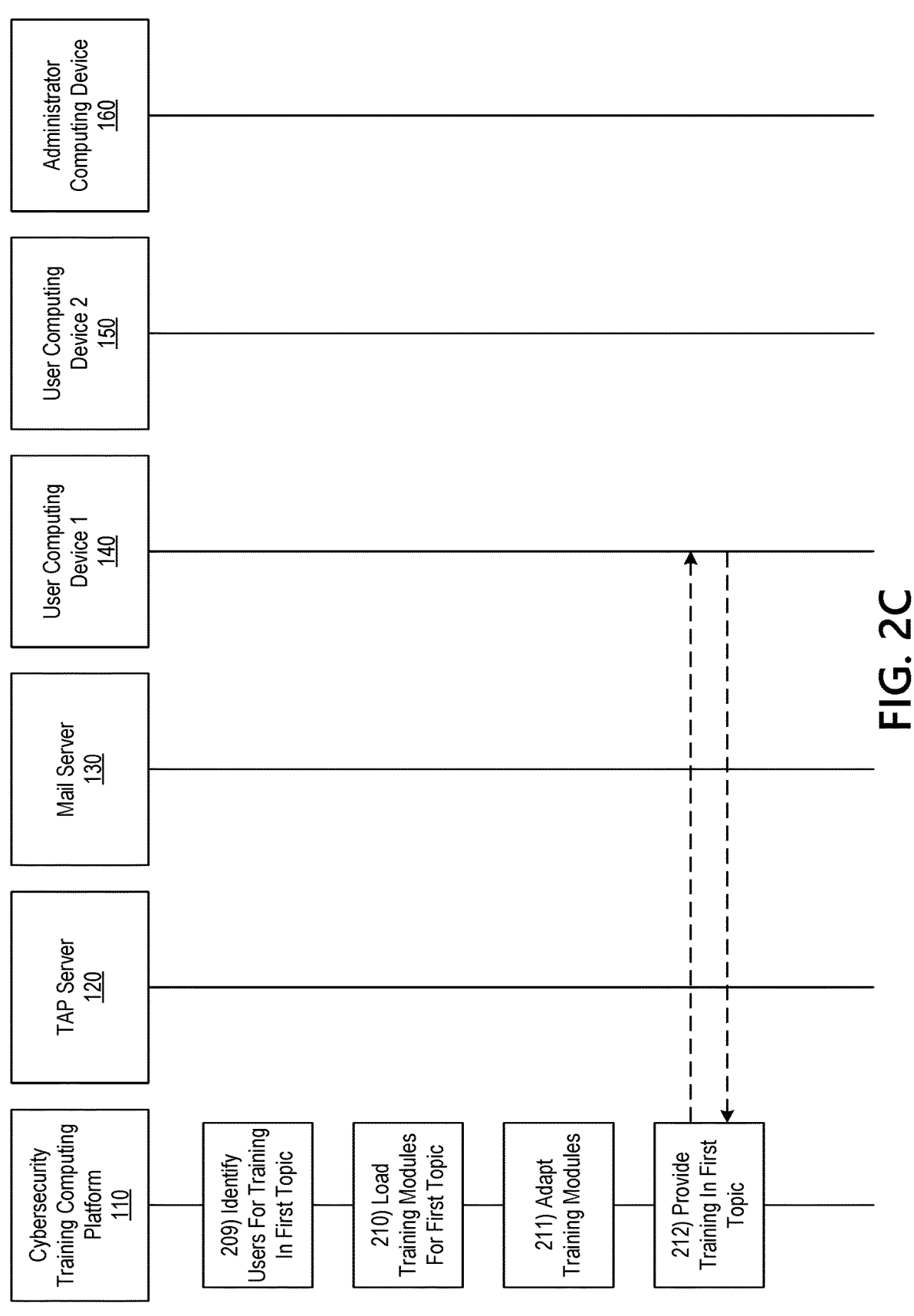

Referring to FIG. 2C, at step 209, cybersecurity training computing platform 110 may identify one or more users to be trained in a first topic (e.g., based on the information received from targeted attack protection server 120, the training profiles generated by cybersecurity training computing platform 110, and/or other information). For example, at step 209, cybersecurity training computing platform 110 may identify one or more users to receive cybersecurity training in a first cybersecurity training topic based on the user-specific threat information indicating the at least one threat that has been encountered by the at least one user. For instance, cybersecurity training computing platform 110 may select one or more specific users (e.g., as identified in the user-specific threat information received from cybersecurity training computing platform 110) to receive and/or complete one or more specific training modules. Cybersecurity training computing platform 110 may, for example, select specific training modules for each user based on the unique combination of threats that they actually encounter (e.g., based on the user-specific information received from targeted attack protection server 120). This approach may, for instance, contrast with alternative approaches in which users are trained on avoiding cybersecurity threats in general, without regard to the threats that they actually encounter. In this way, cybersecurity training computing platform 110 may customize cybersecurity training for each user to cover the specific threats and/or content that each user is actually seeing and/or interacting with on a daily basis in their messages.

In some embodiments, identifying the one or more users to receive the cybersecurity training in the first cybersecurity training topic based on the user-specific threat information indicating the at least one threat that has been encountered by the at least one user may include identifying a first user of the one or more users to receive the cybersecurity training in the first cybersecurity training topic based on the user-specific threat information indicating that the first user has encountered a specific threat corresponding to the first cybersecurity training topic. For example, in identifying the one or more users to receive the cybersecurity training in the first cybersecurity training topic based on the user-specific threat information indicating the at least one threat that has been encountered by the at least one user at step 209, cybersecurity training computing platform 110 may select and/or otherwise identify a first user of the one or more users to receive the cybersecurity training in the first cybersecurity training topic based on the user-specific threat information indicating that the first user has encountered a specific threat corresponding to the first cybersecurity training topic. For instance, cybersecurity training computing platform 110 may select and/or otherwise identify the first user to receive training on how to avoid falling for a business email compromise scam based on the user-specific threat information (e.g., received from targeted attack protection server 120) indicating that the first user received and/or interacted with a message containing a business email compromise threat (e.g., content requesting the user to perform one or more actions that could result in a business email compromise, such as approving and/or paying a fraudulent invoice or inappropriately sharing confidential information).

In some embodiments, identifying the one or more users to receive the cybersecurity training in the first cybersecurity training topic based on the user-specific threat information indicating the at least one threat that has been encountered by the at least one user may include identifying a second user of the one or more users to receive the cybersecurity training in the first cybersecurity training topic based on the user-specific threat information indicating that the second user is a top clicker. For example, in identifying the one or more users to receive the cybersecurity training in the first cybersecurity training topic based on the user-specific threat information indicating the at least one threat that has been encountered by the at least one user at step 209, cybersecurity training computing platform 110 may select and/or otherwise identify a second user of the one or more users to receive the cybersecurity training in the first cybersecurity training topic based on the user-specific threat information indicating that the second user is a top clicker. For instance, cybersecurity training computing platform 110 may select and/or otherwise identify the second user to receive training on how to avoid downloading, executing, and/or otherwise interacting with malware (e.g., malicious software) based on the user-specific threat information (e.g., received from targeted attack protection server 120) indicating that the second user is a top clicker of email links within their group and/or organization. This 'top clicker' status may be determined by targeted attack protection server 120 and received by cybersecurity training computing platform 110 based on targeted attack protection server 120 monitoring the second user's email traffic and interactions with links embedded in emails (e.g., targeted attack protection server 120 may rewrite links embedded in emails to point to targeted attack protection server 120 to enable link scanning/cybersecurity protection services, such as a URL Defense service) and comparing the second user's email traffic and interactions with the email traffic and interactions of other users in the second user's group and/or organization.

In some embodiments, identifying the one or more users to receive the cybersecurity training in the first cybersecurity training topic based on the user-specific threat information indicating the at least one threat that has been encountered by the at least one user may include identifying a third user of the one or more users to receive the cybersecurity training in the first cybersecurity training topic based on the user-specific threat information indicating that the third user is a very attacked person (VAP). For example, in identifying the one or more users to receive the cybersecurity training in the first cybersecurity training topic based on the user-specific threat information indicating the at least one threat that has been encountered by the at least one user at step 209, cybersecurity training computing platform 110 may select and/or otherwise identify a third user of the one or more users to receive the cybersecurity training in the first cybersecurity training topic based on the user-specific threat information indicating that the third user is a very attacked person (VAP). For instance, cybersecurity training computing platform 110 may select and/or otherwise identify the third user to receive training on how to avoid falling for a business email compromise scam based on the user-specific threat information (e.g., received from targeted attack protection server 120) indicating that the third user is a very attacked person within their group and/or organization. This 'very attacked person' status may be determined by targeted attack protection server 120 and received by cybersecurity training computing platform 110 based on targeted attack protection server 120 determining that the third user is a very attacked person because of their role within the organization, their access and/or authority within the organization, and/or other factors. For instance, targeted attack protection server 120 may identify a particular user as being a very attacked person because they are a senior executive with a high level of access within the organization or an accounts payable coordinator with the authority to approve vendor invoices on behalf of the organization.

At step 210, cybersecurity training computing platform 110 may load one or more training modules (e.g., based on the first topic). For example, at step 210, cybersecurity training computing platform 110 may load one or more cybersecurity training modules based on identifying the one or more users to receive the cybersecurity training in the first cybersecurity training topic. For instance, cybersecurity training computing platform 110 may select and/or retrieve such training modules from a library of training templates stored by cybersecurity training computing platform 110, and the selected modules may be linked to and/or otherwise concern the first cybersecurity training topic.

At step 211, cybersecurity training computing platform 110 may adapt the one or more training modules (e.g., based on the information received from targeted attack protection server 120, the training profiles generated by cybersecurity training computing platform 110, and/or other information). For example, at step 211, cybersecurity training computing platform 110 may dynamically adapt at least one training module of the one or more cybersecurity training modules based on the user-specific threat information. In dynamically adapting a training module, cybersecurity training computing platform 110 may, for instance, emphasize and/or highlight certain portions of the training module while deemphasizing and/or omitting other portions of the training module, so as to tailor the training module to a particular user's specific training needs. For instance, if a particular user is at risk for falling for a particular type of malware scam (e.g., as identified in the user-specific threat information received from targeted attack protection server 120), cybersecurity training computing platform 110 may dynamically adapt a malware training module to emphasize portions of the module that deal with the particular type of malware scam while deemphasizing other portions of the module that deal with other types of malware scams.

At step 212, cybersecurity training computing platform 110 may provide training in the first topic (e.g., to user computing device 140). For example, at step 212, cybersecurity training computing platform 110 may provide the one or more cybersecurity training modules to one or more user computing devices (e.g., user computing device 140). For instance, cybersecurity training computing platform 110 may host the one or more cybersecurity training modules and may provide the one or more identified users with access to the training modules. In some instances, in providing the one or more cybersecurity training modules to one or more user computing devices, cybersecurity training computing platform 110 may cause a user device (e.g., user computing device 140) to display and/or otherwise present a graphical user interface similar to graphical user interface 300, which is depicted in FIG. 3. As seen in FIG. 3, graphical user interface 300 may include text and/or other content informing a user that they have been automatically enrolled in a specific type of cybersecurity training based on the threats that they have encountered (e.g., "You have been automatically enrolled in Business Email Compromise (BEC) Training based on the threats you have recently encountered in your incoming email messages."), which may be determined by cybersecurity training computing platform 110 based on the threat information received from targeted attack protection server 120, as discussed above.

In some embodiments, providing the one or more cybersecurity training modules to the one or more user computing devices may include: generating one or more training user interfaces based on information associated with the one or more cybersecurity training modules; and sending, via the communication interface, to a user computing device, the one or more training user interfaces generated based on the information associated with the one or more cybersecurity training modules, where sending the one or more training user interfaces generated based on the information associated with the one or more cybersecurity training modules may cause the user computing device to display the one or more training user interfaces generated based on the information associated with the one or more cybersecurity training modules. For example, in providing the one or more cybersecurity training modules to the one or more user computing devices (e.g., user computing device 140) at step 212, cybersecurity training computing platform 110 may generate one or more training user interfaces based on information associated with the one or more cybersecurity training modules (which may, e.g., be selected, adapted, and/or otherwise loaded from a library maintained by cybersecurity training computing platform 110). In addition, cybersecurity training computing platform 110 may send, via the communication interface (e.g., communication interface 113), to a user computing device (e.g., user computing device 140), the one or more training user interfaces generated based on the information associated with the one or more cybersecurity training modules. In addition, by sending the one or more training user interfaces generated based on the information associated with the one or more cybersecurity training modules to user computing device 140, cybersecurity training computing platform 110 may cause user computing device 140 to display the one or more training user interfaces generated based on the information associated with the one or more cybersecurity training modules. For instance, cybersecurity training computing platform 110 may cause user computing device 140 to display a graphical user interface similar to graphical user interface 300, as discussed above.

In some embodiments, providing the one or more cybersecurity training modules to the one or more user computing devices may include automatically enrolling a specific user in a specific training module. For example, in providing the one or more cybersecurity training modules to the one or more user computing devices (e.g., user computing device 140) at step 212, cybersecurity training computing platform 110 may automatically enroll a specific user in a specific training module. For instance, after identifying that a specific user should receive one or more specific training modules based on the specific threats that they actually encounter (e.g., based on the threat information received from targeted attack protection server 120), cybersecurity training computing platform 110 may automatically enroll the user in the specific training modules. This automatic enrollment may, for instance, include cybersecurity training computing platform 110 sending the user an email invitation and/or other prompt to review and complete the training modules, as well as generating and/or sending one or more user interfaces associated with the training modules (e.g., once the user initiates the training and works to complete the modules).

Figure 2D:
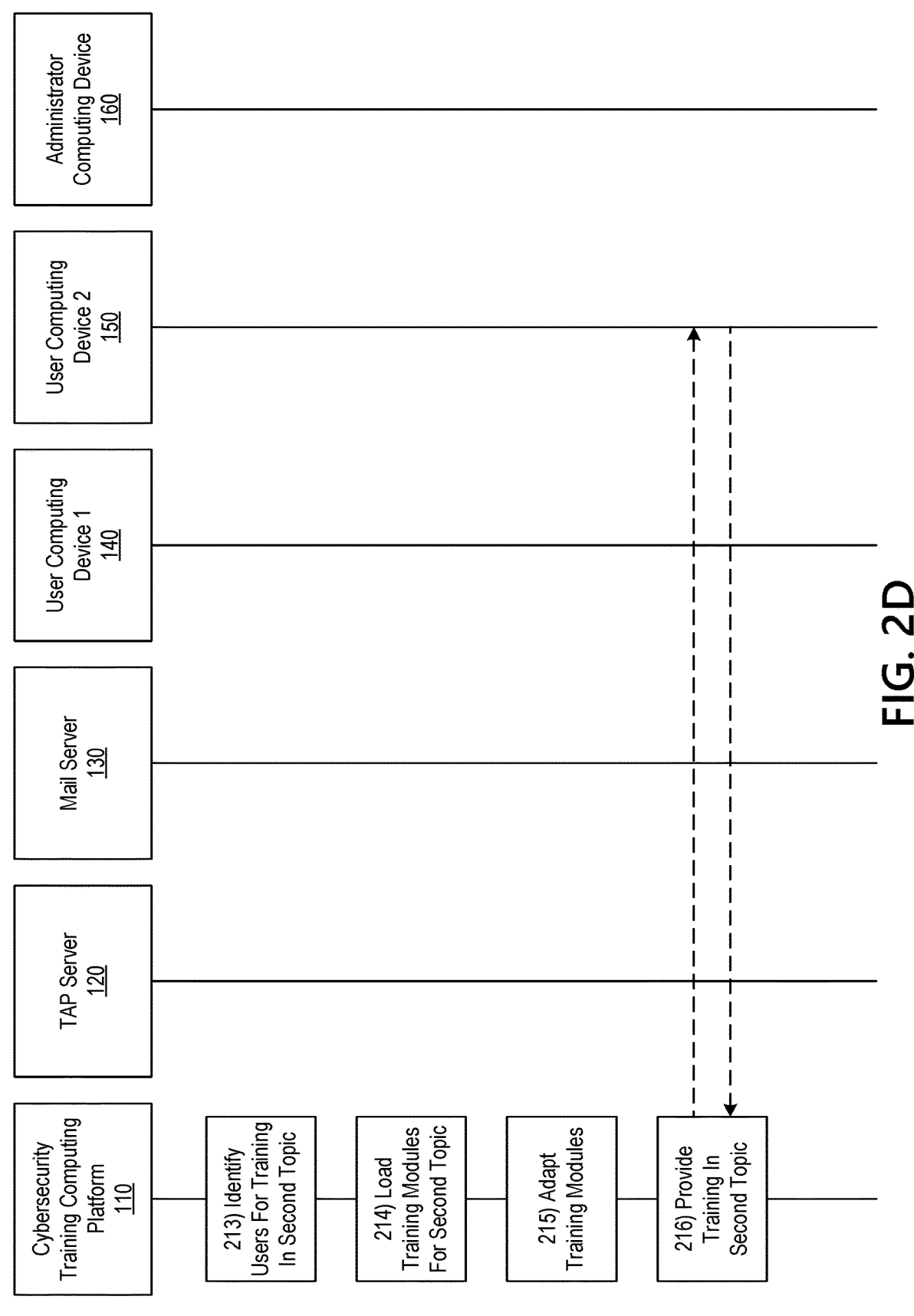

Referring to FIG. 2D, at step 213, cybersecurity training computing platform 110 may identify one or more users to be trained in a second topic (e.g., based on the information received from targeted attack protection server 120, the training profiles generated by cybersecurity training computing platform 110, and/or other information). For example, at step 213, cybersecurity training computing platform 110 may identify one or more additional users to receive cybersecurity training in a second cybersecurity training topic based on the user-specific threat information, where the second cybersecurity training topic is different from the first cybersecurity training topic. For instance, at step 209, cybersecurity training computing platform 110 may have selected a first set of user(s) to receive and/or complete one or more specific training modules concerning a first topic, such as how to identify and avoid phishing email threats, and at step 213, cybersecurity training computing platform 110 may select a second set of user(s) to receive and/or complete one or more specific training modules concerning a second, different topic, such as how to identify and avoid business email compromise (BEC) email threats. Like at step 209, cybersecurity training computing platform 110 may, for example, select specific training modules (e.g., in the second topic) for each user based on the unique combination of threats that they actually encounter (e.g., based on the user-specific information received from targeted attack protection server 120).

At step 214, cybersecurity training computing platform 110 may load one or more training modules (e.g., based on the second topic). For example, at step 214, cybersecurity training computing platform 110 may load one or more additional cybersecurity training modules based on identifying the one or more additional users to receive the cybersecurity training in the second cybersecurity training topic. For instance, cybersecurity training computing platform 110 may select and/or retrieve such training modules from a library of training templates stored by cybersecurity training computing platform 110, and the selected modules may be linked to and/or otherwise concern the second cybersecurity training topic.

At step 215, cybersecurity training computing platform 110 may adapt the one or more additional training modules (e.g., based on the information received from targeted attack protection server 120, the training profiles generated by cybersecurity training computing platform 110, and/or other information). For example, at step 215, cybersecurity training computing platform 110 may dynamically adapt at least one training module of the one or more additional cybersecurity training modules based on the user-specific threat information. In dynamically adapting a training module, cybersecurity training computing platform 110 may, for instance, emphasize and/or highlight certain portions of the training module while deemphasizing and/or omitting other portions of the training module, so as to tailor the training module to a particular user's specific training needs, as in the examples discussed above.

At step 216, cybersecurity training computing platform 110 may provide training in the second topic (e.g., to user computing device 150). For example, at step 216, cybersecurity training computing platform 110 may provide the one or more additional cybersecurity training modules to one or more additional user computing devices (e.g., user computing device 150). For instance, in providing the one or more additional cybersecurity training modules to one or more additional user computing devices, cybersecurity training computing platform 110 may cause a user device (e.g., user computing device 150) to display and/or otherwise present a graphical user interface similar to graphical user interface 400, which is depicted in FIG. 4. As seen in FIG. 4, graphical user interface 400 may include text and/or other content informing a user that they have been automatically enrolled in a specific type of cybersecurity training based on the threats that they have encountered (e.g., "You have been automatically enrolled in Malware Training based on the threats you have recently encountered in your incoming email messages."), which may be determined by cybersecurity training computing platform 110 based on the threat information received from targeted attack protection server 120, as discussed above.

Figure 5:
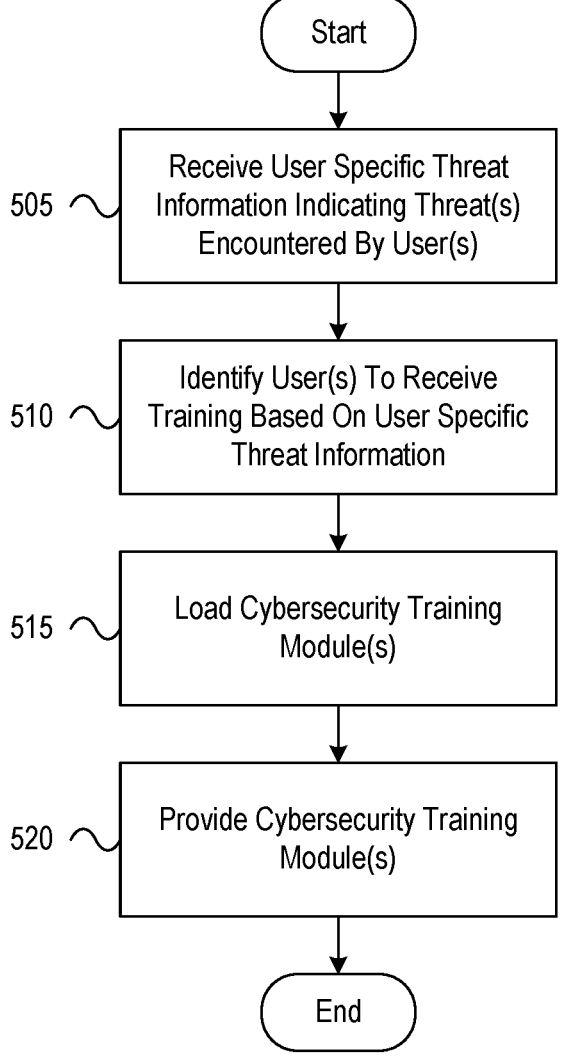
FIG. 5 depicts an illustrative method for dynamically providing cybersecurity training based on user-specific threat information in accordance with one or more example embodiments.

FIG. 5 depicts an illustrative method for dynamically providing cybersecurity training based on user-specific threat information in accordance with one or more example embodiments. Referring to FIG. 5, at step 505, a computing platform having at least one processor, a communication interface, and memory may receive, via the communication interface, from a targeted attack protection (TAP) server, user-specific threat information indicating at least one threat that has been encountered by at least one user. At step 510, the computing platform may identify one or more users to receive cybersecurity training in a first cybersecurity training topic based on the user-specific threat information indicating the at least one threat that has been encountered by the at least one user. At step 515, the computing platform may load one or more cybersecurity training modules based on identifying the one or more users to receive the cybersecurity training in the first cybersecurity training topic. At step 520, the computing platform may provide the one or more cybersecurity training modules to one or more user computing devices.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

16

What is claimed is:

1. A computing platform, comprising:
at least one processor;
a communication interface; and
memory storing computer-readable instructions that, when executed by the at least one processor, cause the computing platform to:
generate and store electronic user profiles for one or more users of an organization;
monitor electronic message traffic by exchanging data with an electronic mail server over a computer network, to determine user-specific threat information indicating at least one threat that has been encountered by at least one user, based on the monitored email message traffic, and identified cybersecurity threats present in the email message traffic of the at least one user;
identify a plurality of users, including the at least one user, to receive cybersecurity training in a first cybersecurity training topic based on the user-specific threat information indicating the at least one threat that has been encountered by the at least one user, the identifying including:
monitoring interactions of the at least one user with network links embedded in one or more email messages;
monitoring interactions of at least one other user with network links embedded in one or more other email messages;
comparing a number of times the at least one user interacts with the network links in the one or more email messages with a number of times the at least one other user interacts with the network links embedded in the one or more other email messages; and
determining that the number of times the at least one user interacts with network links embedded in the one or more email messages is greater than the number of times the at least one other user interacts with network links embedded in the one or more other email messages;
select one or more pre-generated computer-executable cybersecurity training modules from a database of pre-generated training templates for each of the plurality of users based on identifying the plurality of users to receive the cybersecurity training in the first cybersecurity training topic, each of the one of more pre-generated computer-executable cybersecurity training modules being generated prior to the receipt of the user-specific threat information and being generic to the plurality of users;
load the selected one or more pre-generated computer-executable cybersecurity training modules for presentation to the plurality of users;
dynamically adapt, for each of the identified plurality of users, after the selection of the one or more pre-generated computer-executable cybersecurity training modules and based on a plurality of user-specific threat information including the user-specific threat information of the at least one user, the selected one or more pre-generated computer-executable cybersecurity training modules by omitting portions of the one or more computer-executable cybersecurity training modules, thereby generating a plurality of adapted computer-executable cybersecurity training modules, each of the adapted computer-executable cybersecurity training modules being dynamically adapted for a specific user of the identified plurality of users; and provide each of the dynamically adapted computer-executable cybersecurity training modules a user computing device of each corresponding specific user of the identified plurality of users, including causing the computing deviceof each corresponding specific user to present a cybersecurity training application graphical user interface corresponding to a respective one of the dynamically adapted computer-executable cybersecurity training modules.

2. The computing platform of claim 1, wherein the user-specific threat information comprises information indicating that a first enterprise user has encountered a first message-based threat and a second enterprise user has encountered a second message-based threat.

3. The computing platform of claim 1, wherein the user-specific threat information comprises information indicating one or more user identifiers and one or more specific threats corresponding to the one or more user identifiers.

4. The computing platform of claim 1, wherein the user-specific threat information comprises threat family information associated with the at least one user and threat degree information associated with the at least one user.

5. The computing platform of claim 1, wherein identifying the plurality of users to receive the cybersecurity training in the first cybersecurity training topic based on the user-specific threat information indicating the at least one threat that has been encountered by the at least one user comprises identifying a first user of the one or more users to receive the cybersecurity training in the first cybersecurity training topic based on the user-specific threat information indicating that the first user has encountered a specific threat corresponding to the first cybersecurity training topic.

6. The computing platform of claim 1, wherein identifying the plurality of users to receive the cybersecurity training in the first cybersecurity training topic based on the user-specific threat information indicating the at least one threat that has been encountered by the at least one user comprises identifying a second user of the one or more users to receive the cybersecurity training in the first cybersecurity training topic based on the user-specific threat information indicating that the second user is a top clicker.

7. The computing platform of claim 1, wherein identifying the plurality of users to receive the cybersecurity training in the first cybersecurity training topic based on the user-specific threat information indicating the at least one threat that has been encountered by the at least one user comprises identifying a third user of the one or more users to receive the cybersecurity training in the first cybersecurity training topic based on the user-specific threat information indicating that the third user is a very attacked person (VAP).

8. The computing platform of claim 1, wherein providing the cybersecurity training modules to the identified plurality of users comprises:

generating one or more training user interfaces, including the cybersecurity training application graphical user interface, based on information associated with the selected one or more pre-generated cybersecurity training modules; and sending, via the communication interface, to a user computing device, the one or more training user interfaces generated based on the information associated with the selected one or more pre-generated cybersecurity training modules.

9. The computing platform of claim 1, wherein providing the cybersecurity training modules to the identified plurality of users comprises automatically enrolling a specific user in a specific training module.

10. The computing platform of claim 1, wherein the memory stores additional computer-readable instructions that, when executed by the at least one processor, cause the computing platform to:

identify one or more additional users to receive cybersecurity training in a second cybersecurity training topic based on the user-specific threat information, wherein the second cybersecurity training topic is different from the first cybersecurity training topic;

select and load one or more additional pre-generated cybersecurity training modules from the database based on identifying the one or more additional users to receive the cybersecurity training in the second cybersecurity training topic; and provide the one or more additional cybersecurity training modules to one or more additional user computing devices.

11. The computing platform of claim 10, wherein the memory stores additional computer-readable instructions that, when executed by the at least one processor, cause the computing platform to:

prior to providing the one or more additional cybersecurity training modules to the one or more additional user computing devices, dynamically adapt at least one training module of the one or more additional cybersecurity training modules based on the user-specific threat information.

12. A method, comprising:

at a computing platform comprising at least one processor, a communication interface, and memory:

generating and storing electronic user profiles for one or more users of an organization;

monitoring electronic mail messages for the one or more users to determine user-specific threat information indicating at least one threat encountered by at least one user, wherein the user-specific threat information indicating at least one threat encountered by the at least one user is determined based on email message traffic monitored by exchanging data with an electronic mail server over a computer network, and identified cybersecurity threats present in the email message traffic of the at least one user;

identifying, by the at least one processor, a plurality of users, including the at least one user, to receive cybersecurity training in a first cybersecurity training topic based on the user-specific threat information indicating the at least one threat that has been encountered by the at least one user, the identifying including:

monitoring interactions of the at least one user with network links embedded in one or more email messages;

monitoring interactions of at least one other user with network links embedded in one or more other email messages;

comparing a number of times the at least one user interacts with the network links in the one or more email messages with a number of times the at least one other user interacts with the network links embedded in the one or more other email messages; and determining that the number of times the at least one user interacts with network links embedded in the one or more email messages is greater than the number of times the at least one other user interacts with network links embedded in the one or more other email messages;

selecting one or more pre-generated computer-executable cybersecurity training modules from a database of pre-generated training templates for each of the plurality of users based on identifying the plurality of users to receive the cybersecurity training in the first cybersecurity training topic, each of the one or more pre-generated computer-executable cybersecurity training modules being generated prior to the receipt of the user-specific threat information and being generic to the plurality of users;

loading, by the at least one processor, the selected one or more pre-generated computer-executable cybersecurity training modules for presentation to the plurality of users;

dynamically adapting, for each of the identified plurality of users, after the selection of the one or more pre-generated computer-executable cybersecurity training modules and based on a plurality of user-specific threat information including the user-specific threat information, the selected one or more pre-generated computer-executable cybersecurity training modules by omitting portions of the one or more computer-executable cybersecurity training modules, thereby generating a plurality of adapted computer-executable cybersecurity training modules, each of the adapted computer-executable cybersecurity training modules being dynamically adapted for a specific user of the identified plurality of users; and providing, by the at least one processor, each of the dynamically adapted computer-executable cybersecurity training modules to a user computing device of a corresponding specific user of the identified plurality of users, including causing the user computing device of each corresponding specific user to present a cybersecurity training application graphical user interface corresponding to a respective one of the dynamically adapted computer-executable cybersecurity training modules.

13. The method of claim 12, wherein the user-specific threat information indicating the at least one threat encountered by the at least one user comprises information indicating that a first enterprise user has encountered a first message-based threat and a second enterprise user has encountered a second message-based threat.

14. The method of claim 12, wherein the user-specific threat information indicating the at least one threat encountered by the at least one user comprises information indicating one or more user identifiers and one or more specific threats corresponding to the one or more user identifiers.

15. The method of claim 12, wherein the user-specific threat information indicating the at least one threat encountered by the at least one user comprises threat family information associated with the at least one user and threat degree information associated with the at least one user.

16. The method of claim 12, wherein identifying the plurality of users to receive the cybersecurity training in the first cybersecurity training topic based on the user-specific threat information indicating the at least one threat that has been encountered by the at least one user comprises identifying a first user of the one or more users to receive the cybersecurity training in the first cybersecurity training topic based on the user-specific threat information indicating that the first user has encountered a specific threat corresponding to the first cybersecurity training topic.

17. One or more non-transitory computer-readable media storing instructions that, when executed by a computing platform comprising at least one processor, a communication interface, and memory, cause the computing platform to:

generate and store electronic user profiles for one or more users of an organization;

monitor electronic mail messages for the one or more users to determine user-specific threat information indicating at least one threat encountered by at least one user, wherein the user-specific threat information indicating at least one threat encountered by the at least one user is determined based on email message traffic monitored by exchanging data with an electronic mail server over a computer network, and identified cybersecurity threats present in the email message traffic of the at least one user;

identify a plurality of users to receive cybersecurity training in a first cybersecurity training topic based on the user-specific threat information indicating the at least one threat that has been encountered by the at least one user, the identifying including:

monitoring interactions of the at least one user with network links embedded in one or more email messages;

monitoring interactions of at least one other user with network links embedded in one or more other email messages;

comparing a number of times the at least one user interacts with the network links in the one or more email messages with a number of times the at least one other user interacts with the network links embedded in the one or more other email messages; and determining that the number of times the at least one user interacts with network links embedded in the one or more email messages is greater than the number of times the at least one other user interacts with network links embedded in the one or more other email messages;

select one or more pre-generated computer-executable cybersecurity training modules from a database of pre-generated training templates for each of the plurality of users based on identifying the plurality of users to receive the cybersecurity training in the first cybersecurity training topic, each of the one or more pre-generated computer-executable cybersecurity training modules being generated prior to the receipt of the user-specific threat information and being generic to the plurality of users;

load the selected one or more pre-generated computer-executable cybersecurity training modules for presentation to the plurality of users;

dynamically adapt, for each of the identified plurality of users after the selection of the one or more pre-generated computer-executable cybersecurity training modules and based on a plurality of user-specific threat information including the user-specific threat information, the selected one or more pre-generated computer-executable cybersecurity training modules by omitting portions of the one or more computer-executable cybersecurity training modules, thereby generating a plurality of adapted computer-executable cybersecurity training modules, each of the adapted computer-executable cybersecurity training modules being dynamically adapted for a specific user of the identified plurality of users; and provide each of the dynamically adapted computer-executable cybersecurity training modules a computing device of each corresponding specific user of the identified plurality of users, including causing the computing device of each corresponding specific user to present a cybersecurity training application graphical user interface corresponding to a respective one of the dynamically adapted computer-executable cybersecurity training modules.

\* \* \* \* \*